UNITED STATES PATENT OFFICE.

LEWIS A. LEONARD, OF NEW YORK, AND JESSE P. LARRIMER, OF BROOKLYN, NEW YORK.

PROCESS OF PRODUCING IRON OF HIGH GRADE FROM ORDINARY CAST-IRON.

1,194,756. Specification of Letters Patent. Patented Aug. 15, 1916.

No Drawing. Application filed April 6, 1912. Serial No. 689,035.

*To all whom it may concern:*

Be it known that we, LEWIS A. LEONARD, a citizen of the United States, and a resident of New York city, in the county and State of New York, and JESSE P. LARRIMER, a citizen of the United States, and a resident of Brooklyn, in the county of Kings and State of New York, have invented certain new and useful Improvements in Processes of Producing Iron of High Grade from Ordinary Cast-Iron, of which the following is a specification.

The invention relates to improvements in the art of producing an iron of high grade or one possessing characteristics of good cast steel from ordinary cast iron.

Our invention pertains to methods of treating cast iron whereby, without reducing the iron to a molten state or changing its material shape or proportions, we very greatly improve and change the character of the same, the cast iron being converted into a condition in which it possesses many of the characteristics of good cast steel.

The invention comprises methods whereby the quality of the cast iron may be very greatly improved whether the metal be in the form of bars or finished machine parts, such as gears, cams and the like, and the degree of hardness and toughness imparted to the metal varied as conditions or circumstances of its intended use may require.

Our invention comprises as an important feature the treatment of a piece of cast iron without reducing it to a molten state whereby the metal becomes conditioned for the further step or steps of the process in which it is subjected to the action of carboniferous material, such carboniferous substance being an element or elements of a cold bath into which the iron, when hot, is immersed for a period varying with the degree of hardness or toughness required.

The first step of our process has for its purpose therefore the conditioning of the cast iron for the further step or steps of our process, and in carrying out this first step of the process we subject the pieces of cast iron of whatever form they may be to a baking in a closed metal box or holder containing a body of material in which the pieces of metal are embedded and which comprises a suitable substance or substances which so act upon or co-act with the metal during the baking step that the metal is conditioned or rendered susceptible to the action of the subsequent step or steps of the process. The body of material in which we prefer to bake, in an air-tight box or holder, the pieces of iron, comprises hydrated oxid of iron, silica and a small percentage of phosphorus, there being approximately about twenty-five per cent. of hydrated oxid of iron and approximately about seventy-five per cent. of silica. The percentage of phosphorus may be from one-half to one per cent. The proportions mentioned may, of course, vary with the thoroughness with which the process may be carried out. We have used the materials named in about the proportions stated with entire success in the treatment of cast iron. We have found that the ingredients abovenamed and in about the proportions given, are present in some low grades of iron ore which we have used with entire satisfaction in carrying out our process, and while we prefer to use the substances as found in nature, we do not wish to confine our invention to such use nor to the specific ingredients named. The pieces of iron embedded in the material indicated and confined within a closed box or holder are baked in a retort of usual or any suitable construction at a uniform heat for from about three to about fifteen hours, the time varying with the thickness of the pieces and the degree of thoroughness with which it may be desired to carry out the process and the degree of heat employed being sufficient to bring the pieces to and maintain them at about a cherry-red color, or from about six hundred to eight hundred degrees Fahrenheit, according to the character of the metal and the thickness of the pieces thereof. The effect of the baking of the pieces of metal is that the metal becomes transformed or conditioned to readily yield to or become affected by the further step of the process. After the baking step of our process hereinbefore described has been performed, the iron will be removed from the box or holder and while hot at once plunged into a cold bath of water in which has been incorporated carboniferous material suitable for hardening or toughening the iron, such bath containing, for illustration, sulfate of lime, preferably granulated, and ferric oxid mixed with powdered charcoal, ground burnt bone or other carboniferous material, in the preferred proportions of about ten per cent. of the carboniferous material to ninety per cent. of the ferric oxid, by weight. The proportion of the sulfate of lime used in the bath is equal to about six per cent. of the total weight of the ferric oxid and carboniferous material. The degree of hardness or toughness imparted to the iron by said bath will depend on the length of time it remains in the bath; by allowing the iron to remain in the bath only a very brief period we obtain a case-hardening of the iron, and when the iron remains in the bath until the latter can act through the thickness of the piece, the latter becomes hardened throughout to a remarkable degree and converted or changed from its iron nature to the quality or character of cast steel.

Our process as applied to iron is of very great value in many ways. If, for instance, we are treating machine parts such as gears or cams, we so harden the same that anything like rapid wear is entirely prevented, and an important feature of the process is that in treating gears, cams and the like, the proportions of the same are not materially varied, the dimensions remaining the same but the metal being changed from a low grade or quality to a high grade or quality, or from ordinary cast iron to a metal possessing characteristics of good cast steel. Our invention renders it entirely practicable to harden the pieces of iron throughout to a maximum degree or to vary the degree and depth of the hardening as circumstances require.

An essential portion of the invention resides in the first step of the process whereby the iron, without being reduced to a molten state or varied in its shape or proportions, is rendered suitable for the subsequent step of the process in which it is subjected to the action of a bath containing carbon, as explained hereinbefore.

The result of our process is that by it we thoroughly convert or transform the cast iron from its ordinary condition to one of high grade capable of many of the uses to which high grade metals are put, and that at the same time we may secure a degree of hardness extending entirely through the pieces of metal not attained heretofore by any processes known to us.

What we claim as our invention and desire to secure by Letters-Patent, is:

1. A process of treating cast iron for converting it into a metal of higher grade, which comprises the baking of the iron in a closed holder in the presence of a substance preparing the iron to be successfully acted on by carbon, and then quenching the iron in a bath containing carbon.

2. A process of treating cast iron for converting it into a metal of higher grade, which comprises the baking of the iron in a closed holder in the presence of a substance preparing the iron to be successfully acted on by carbon, and then quenching the iron in a bath containing sulfate of lime, ferric oxid and carboniferous material.

3. A process of treating cast iron for converting it into a metal of higher grade which comprises the baking of the iron in a closed holder in the presence of hydrated oxid of iron and silica, and then quenching the iron in a bath.

4. A process of treating cast iron for converting it into a metal of higher grade which comprises the baking of the iron in a closed holder in the presence of hydrated oxid of iron and silica, and then quenching the iron in a bath containing sulfate of lime, ferric oxid and carboniferous material.

5. A process of treating cast iron for converting it into a metal of higher grade which comprises the baking of the iron in a closed holder in the presence of hydrated oxid of iron, silica and phosphorus, and then quenching the iron in a bath containing carbon.

Signed at New York city, in the county and State of New York, this 5th day of April, 1912.

LEWIS A. LEONARD.
JESSE P. LARRIMER.

Witnesses:
ARTHUR MARION,
CHARLES C. GILL.